US008654038B2

(12) United States Patent
Sato (10) Patent No.: US 8,654,038 B2
(45) Date of Patent: Feb. 18, 2014

(54) HEAD MOUNTED DISPLAY AND IMAGING DATA USAGE SYSTEM INCLUDING THE SAME

(75) Inventor: Tomohiro Sato, Nagoya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 767 days.

(21) Appl. No.: 12/876,704

(22) Filed: Sep. 7, 2010

(65) Prior Publication Data

US 2011/0074658 A1    Mar. 31, 2011

(30) Foreign Application Priority Data

Sep. 25, 2009  (JP) .................................. 2009-221679

(51) Int. Cl.
*G09G 5/00* (2006.01)
(52) U.S. Cl.
USPC ................................................................ 345/8
(58) Field of Classification Search
USPC ................................................................ 345/8
See application file for complete search history.

(56) References Cited

U.S. PATENT DOCUMENTS

| 7,126,558 | B1 * | 10/2006 | Dempski ........................... 345/8 |
| 7,586,517 | B2 | 9/2009 | Iguchi et al. |
| 2003/0063321 | A1 | 4/2003 | Inoue et al. |
| 2006/0090135 | A1 * | 4/2006 | Fukuda ........................ 715/727 |

FOREIGN PATENT DOCUMENTS

| JP | A-2000-306365 | 11/2000 |
| JP | A-2003-219327 | 7/2003 |
| JP | A-2004-21931 | 1/2004 |
| JP | A-2006-157893 | 6/2006 |
| JP | A-2008-003781 | 1/2008 |
| JP | A-2008-48204 | 2/2008 |

OTHER PUBLICATIONS

Dec. 11, 2012 Office Action issued in Japanese Patent Application No. 2009-221679 (with translation).

* cited by examiner

*Primary Examiner* — Ariel Balaoing
*Assistant Examiner* — Larry Sternbane
(74) *Attorney, Agent, or Firm* — Oliff PLC (57) ABSTRACT

A head mounted display includes: an image presentation portion that sequentially presents each of content images to a user's eye; an imaging portion that images an object when the content images are presented; an event acquisition portion that acquires an event occurring outside; a storage control unit that stores imaging data including the imaged object and imaging time position information regarding an imaging time; an event determination unit that determines whether the acquired event has a specific feature; a first specification unit that specifies first time position information regarding a timing when the event having the specific feature is occurred; and a first association registration unit, which, when the event has the specific feature, associates presentation identification information for identifying the presented content images with the first time position information, and which registers the presentation identification information and the first time position information.

16 Claims, 10 Drawing Sheets

| RECORD NO. | FEATURE | DATE AND TIME | PAGE NUMBER | DESTINATION ADDRESS OF SOUND DATA |
|---|---|---|---|---|
| Tag. 1 | START SIGNAL | 2009/09/09 12:10:38 | 1 | Sound1.wav |
| Tag. 2 | OCCURRENCE OF DANGEROUS TIME | 2009/09/09 12:15:50 | 8 | Sound2.wav |
| Tag. 3 | SIGNAL | 2009/09/09 18:52:47 | 9 | Sound3.wav |

| PAGE NUMBER | DATE AND TIME |
|---|---|
| 1 | 2009/09/09 12:10:33 |
| 2 | 2009/09/09 12:15:45 |
| ⋮ | ⋮ |
| 7 | 2009/09/09 18:45:52 |
| 8 | 2009/09/09 18:43:21 |
| 9 | 2009/09/09 18:52:42 |
| ⋮ | ⋮ |

HEAD MOUNTED DISPLAY AND IMAGING DATA USAGE SYSTEM INCLUDING THE SAME

CROSS-REFERENCE TO RELATED APPLICATIONS

This application claims priority from Japanese Patent Application No. 2009-221679, filed Sep. 25, 2009, the disclosure of which is incorporated herein by reference in its entirety.

BACKGROUND

Aspects of the present invention relate to a head mounted display, which present content images indicated by content data to a user's eye, and an imaging data usage system including the head mounted display.

There has been proposed a see-through head mounted display that presents content images indicated by content data to a user's eye.

For example, a known head mounted display includes a head mounted audio-visual (AV) device, a storage portion and an animation display processing function. The head mounted AV device includes a liquid crystal display panel and a glass portion. The liquid crystal display panel is a transmissive liquid crystal display panel which displays an image. The glass portion is mounted on a head portion so that the liquid crystal display panel is located in the front of the eyes. The storage portion stores various types of animation images created in advance by modeling on a work target of each work process. In accordance with a sequence of each work process, the animation display process function displays an animation image on the liquid crystal display panel so that a corresponding animation image is overlaid on the work target viewed by a user through the liquid crystal display panel. Work content to be executed for the work target is displayed to a wearer by the known head mounted display displaying an animation image on the liquid crystal display panel according to the sequence of each work process.

Further, a known imaging device includes an image processing unit, a sound processing unit and a unique identification information processing unit. The image processing unit extracts an image feature amount representing a change of a photographic state from an image signal obtained by photographing an object. The sound processing unit extracts a sound feature amount representing a change of a photographic state from a sound signal obtained by acquiring a sound. The unique identification information processing unit extracts a state feature amount representing a change of a photographic state based on information indicating a photographer's physiological change. The known imaging device determines whether or not a photographing timing created by the feature amount is appropriate as an edit point by comparing the extracted feature amount with a preset detection strength.

SUMMARY

For example, there is a situation where a manual is displayed to a user by a head mounted display. The manual may be a job order including a plurality of pages which describes each process of work to be carried out in various work sites. In this case, if a situation of a work that is currently being done is imaged and the imaged data of the work is used thereafter, it becomes convenient to describe the work for a person who is unfamiliar with the work. The inventor has considered that imaging data serves as an effective tool when content related to each page of the manual is reproduced. That is, the inventor has considered that it is effective to reproduce content related to a content image indicated by content data such as a manual or the like for work.

Illustrative aspects of the present invention provide a head mounted display and an imaging data usage system including the same for appropriately providing content related to content images indicated by content data.

According to one illustrative aspect of the present invention, there is provided a head mounted display comprising: an image presentation portion that sequentially presents each of content images indicated by content data to a user's eye; an imaging portion that images an object when the content images are presented by the image presentation portion; an event acquisition portion that acquires an event occurring outside the head mounted display; a storage control unit that stores imaging data including the object imaged by the imaging portion and imaging time position information regarding an imaging time in an imaging data storage portion; an event determination unit that determines whether the event acquired by the event acquisition portion has a specific feature; a first specification unit that specifies first time position information regarding a timing when the event determined to have the specific feature by the event determination unit is occurred; and a first association registration unit, which, when the event determination unit determines that the event has the specific feature, associates presentation identification information for identifying the content images presented by the image presentation portion with the first time position information, and which registers the presentation identification information and the first time position information in a first association storage unit.

According to another illustrative aspect of the present invention, there is provided a head mounted display comprising: an image presentation portion that sequentially presents each of content images indicated by content data to a user's eye; an imaging portion that images an object when the content images are presented by the image presentation portion; an event acquisition portion that acquires an event occurring outside the head mounted display; and a processor configured to execute instructions grouped into functional units, the instructions including: a storage control unit that stores imaging data including the object imaged by the imaging portion and imaging time position information regarding an imaging time in an imaging data storage portion; an event determination unit that determines whether the event acquired by the event acquisition portion has a specific feature; a first specification unit that specifies first time position information regarding a timing when the event determined to have the specific feature by the event determination unit is occurred; and a first association registration unit, which, when the event determination unit determines that the event has the specific feature, associates presentation identification information for identifying the content images presented by the image presentation portion with the first time position information, and which registers the presentation identification information and the first time position information in a first association storage unit.

According to still another illustrative aspect of the present invention, there is provided an imaging data usage system comprising: at least one head mounted display; and an information processing device, wherein the head mounted display comprises: an image presentation portion that sequentially presents each of content images indicated by content data to a user's eye; an imaging portion that images an object when the content images are presented by the image presentation portion; an event acquisition portion that acquires an event occurring outside the head mounted display; a storage control unit that stores imaging data including the object imaged by the imaging portion and imaging time position information regarding an imaging time in an imaging data storage portion; an event determination unit that determines whether the event acquired by the event acquisition portion has a specific feature; a first specification unit that specifies first time position information regarding a timing when the event determined to have the specific feature by the event determination unit is occurred; and a first association registration unit, which, when the event determination unit determines that the event has the specific feature, associates presentation identification information for identifying the content images presented by the image presentation portion with the first time position information, and which registers the presentation identification information and the first time position information in a first association storage unit, and wherein the information processing device comprises: a display portion that displays the content images; an identification information determination unit that determines whether the presentation identification information consistent with display identification information for identifying the content images displayed on the display portion is registered in the first association storage unit by accessing the first association storage unit when the content images are displayed on the display portion; a first acquisition unit that acquires the first time position information associated with the presentation identification information consistent with the display identification information when the identification information determination unit determines that the presentation identification information consistent with the display identification information is registered in the first association storage unit; and a reproduction unit that accesses the imaging time position information corresponding to the first time position information and the imaging data stored in the imaging data storage portion, and the reproduction unit specifies a part of the imaging data imaged at a predetermined point in time corresponding to the first time position information acquired by the first acquisition unit by the imaging time position information, wherein the reproduction unit reproduces the specified part of the imaging data.

BRIEF DESCRIPTION OF THE DRAWINGS

Illustrative aspects of the invention will be described in detail with reference to the following figures wherein.

DETAILED DESCRIPTION

Exemplary embodiments of the present invention will now be described with reference to the drawings.

(Imaging Data Usage System)

Figure 1:
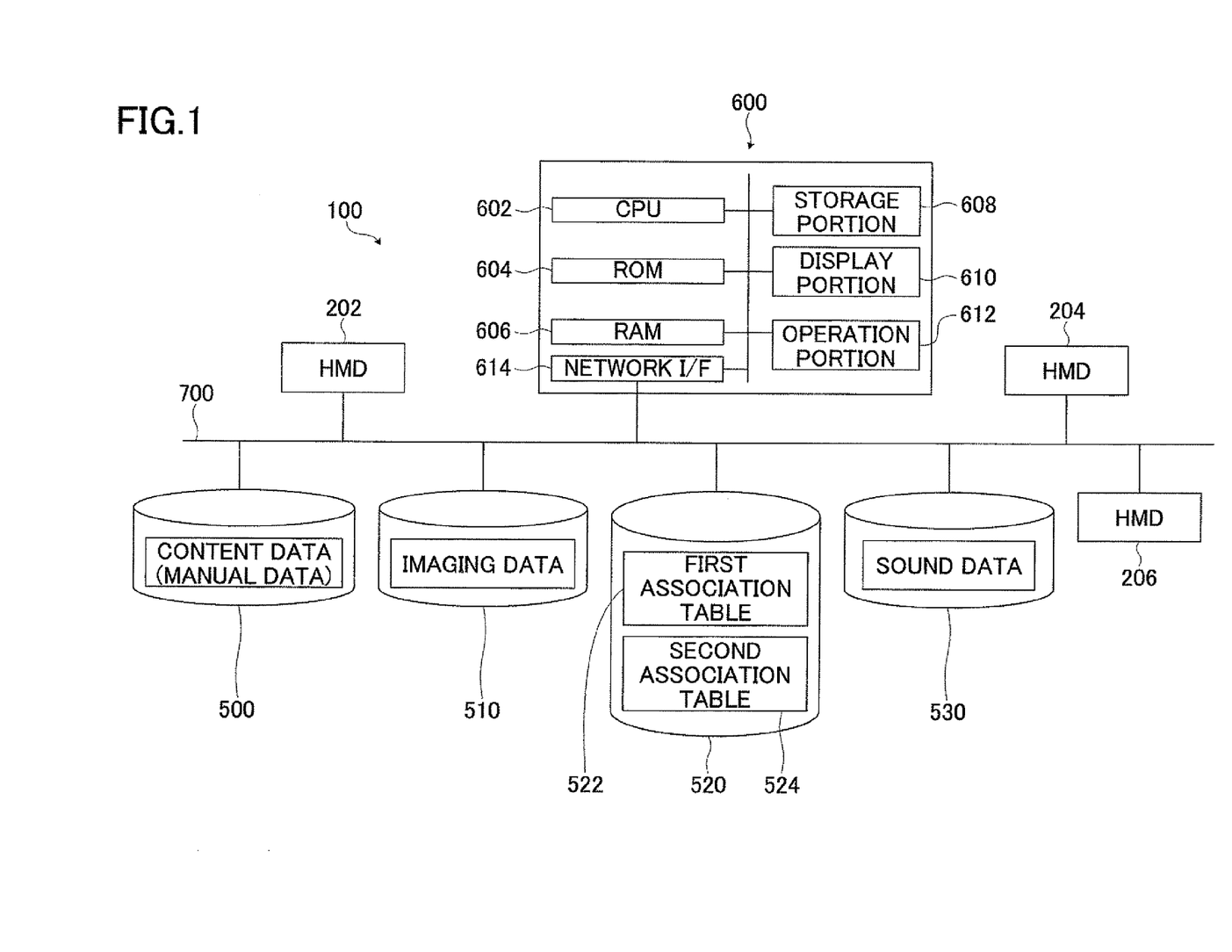
FIG. 1 is a diagram showing an imaging data usage system.

An imaging data usage system 100 will be described with reference to FIG. 1. The imaging data usage system 100 includes head mounted displays (hereinafter, referred to as "HMDs") 202, 204 and 206, a content data storage portion 500, an imaging data storage portion 510, a table storage portion 520, a sound data storage portion 530 and an information processing device 600. These devices are connected to be communicable with one another. For example, these are connected via a network 700 such as a LAN or WAN. Each of the HMDs 202, 204 and 206, the content data storage portion 500, the imaging data storage portion 510, the table storage portion 520 and the sound data storage portion 530 may be connected by a memory bus as well as the connection via the network 700. In this case, each of the HMDs 202, 204 and 206 includes the storage portions 500, 510, 520 and 530, which are formed as one body. Hereinafter, when the HMDs 202, 204 and 206 are not distinguished, each of which is referred to as "HMD 200".

The content data storage portion 500 is an area where content data to be viewed by the HMD 200 is stored. For example, manual data related to a predetermined work manual is stored as content data in the content data storage portion 500. The imaging data storage portion 510 is an area where imaging data imaged by the HMD 200 is stored. The table storage portion 520 is an area where a first association table 522 shown in FIG. 6 and a second association table 524 (adopted in a presentation image switching process shown in FIG. 9) shown in FIG. 10 are stored. The first association table 522 and the second association table 524 will be described later. The sound data storage portion 530 is an area where sound data recorded by the HMD 200 is stored. The content data storage portion 500, the imaging data storage portion 510, the table storage portion 520 and the sound data storage portion 530 may be either a plurality of storage areas or one storage area in hardware.

Figure 7:
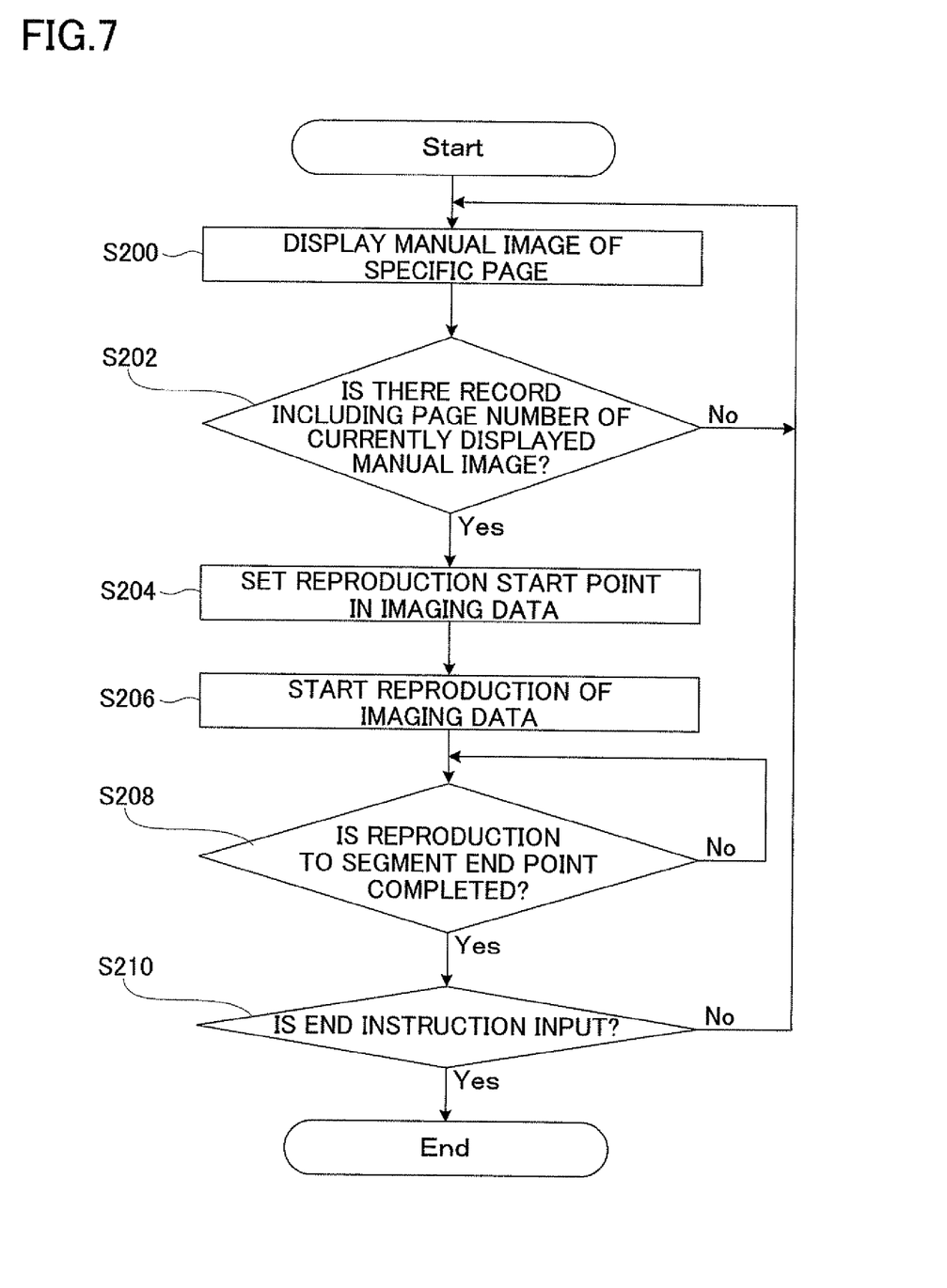
FIG. 7 is a diagram showing a flowchart of a first example of a process during reproduction.
Figure 8:
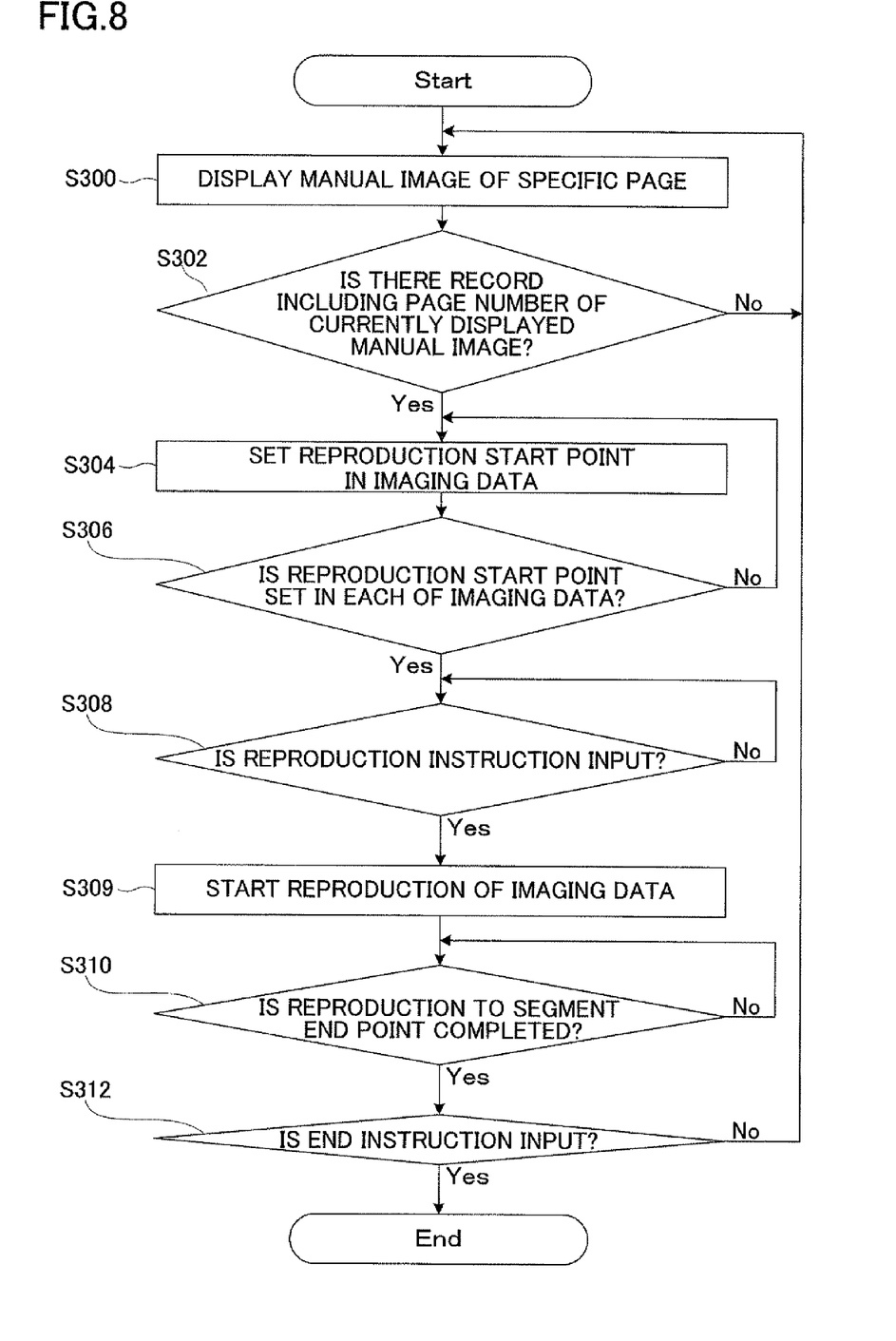
FIG. 8 is a diagram showing a flowchart of a second example of the process during reproduction.

For example, the information processing device 600 is configured by a personal computer used in the related art. The information processing device 600 includes a CPU 602, a ROM 604, a RAM 606, a storage portion 608, a display portion 610, an operation portion 612 and a network interface (network I/F) 614. For example, the storage portion 608 is configured by a hard disk drive or an SSD (Solid State Drive). A program for a process during reproduction to be described later on the basis of FIGS. 7 and 8 is stored in the storage portion 608. The CPU 602 reads out the program from the storage portion 608 and executes the program on the RAM 606. The display portion 610 displays various types of information. The operation portion 612 includes a keyboard, a mouse, or the like. The network I/F 614 performs communication via the network 700.

(Head Mounted Display)

Figure 2:
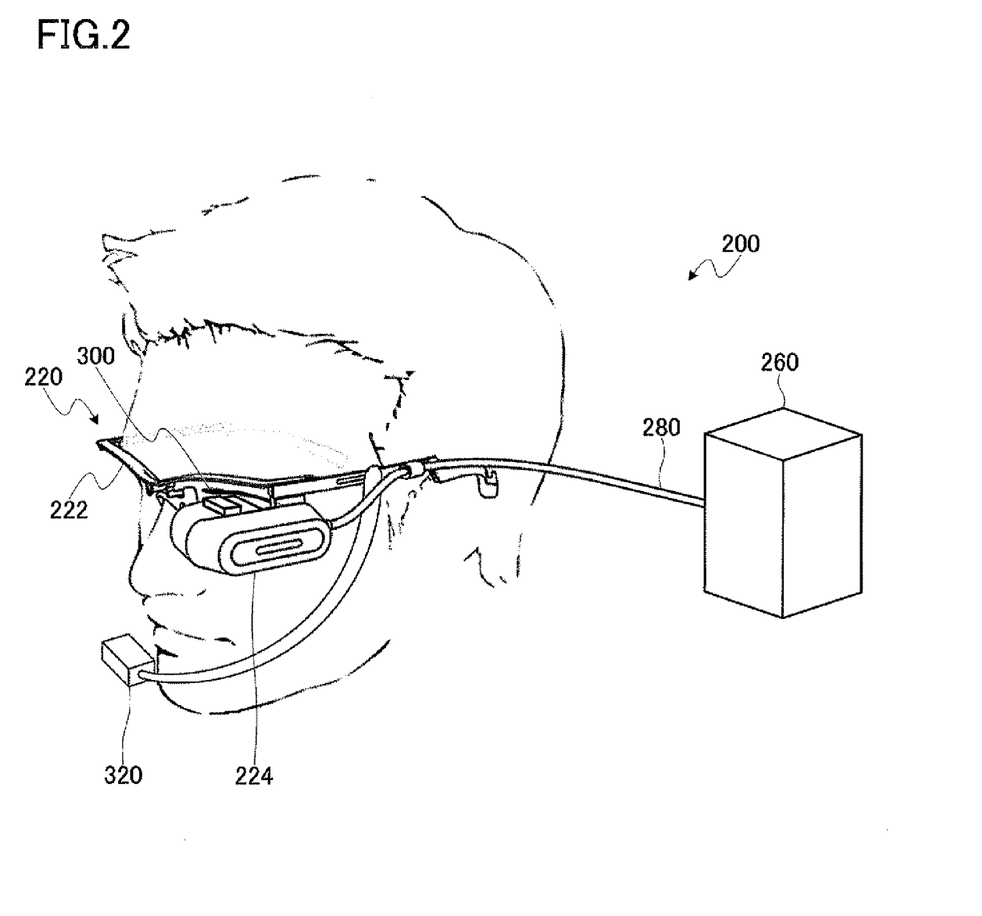
FIG. 2 is a diagram showing a head mounted display.

The configuration of the HMD 200 will be described with reference to FIG. 2. The HMD 200 includes an HMD main body 220, a control box 260, a CCD sensor 300 and a microphone 320. The HMD main body 220, the CCD sensor 300 and the microphone 320 are connected to the control box 260 via a signal cable 280. Various signals are input/output between the HMD main body 220 or the like and the control box 260. The HMD main body 220 is mounted and used on a user's face. The control box 260 is attached and used around the user's waist.

The HMD main body 220 has the same frame structure 222 as a normal pair of glasses. The HMD main body 220 is supported by the user's face by the frame structure 222. An image presentation portion 224 is attached to a predetermined position of the frame structure 222. The image presentation portion 224 presents a content image to be viewed by the user to the user's eye, for example, the left eye based on the configuration of FIG. 2. The image presentation portion 224 is disposed in a position at the same height as the left eye of the user on which the HMD main body 220 is mounted in a state in which the image presentation portion 224 is attached to the frame structure 222. The CCD sensor 300 is attached to the top of the image presentation portion 224. A microphone stay extending to the user's mouth is attached to the frame structure 222. The microphone 320 is attached to the tip end of the microphone stay.

The image presentation portion 224 is configured by a retinal scan display. Specifically, the retinal scan display scans image light corresponding to an image signal output from the control box 260 in a two-dimensional direction, leads the scanned image light to the left eye, and forms a content image on the retina. The image light emitted from the image presentation portion 224 is reflected by a half mirror (not shown in FIG. 2) and is led to the left eye. The half mirror is disposed in a position in the front of the user's left eye and is fixed on the image presentation portion 224. The image light emitted from the image presentation portion 224 is fixed on the image presentation portion 224, and the image light is reflected by a half mirror (not shown in FIG. 2), which is disposed in a position in the front of the user's left eye, and is led to the left eye. The image presentation portion 224 may be the configuration using a liquid crystal display, an organic EL display (Organic Electroluminescence display), or other devices in addition to the retinal scan display.

Figure 3:
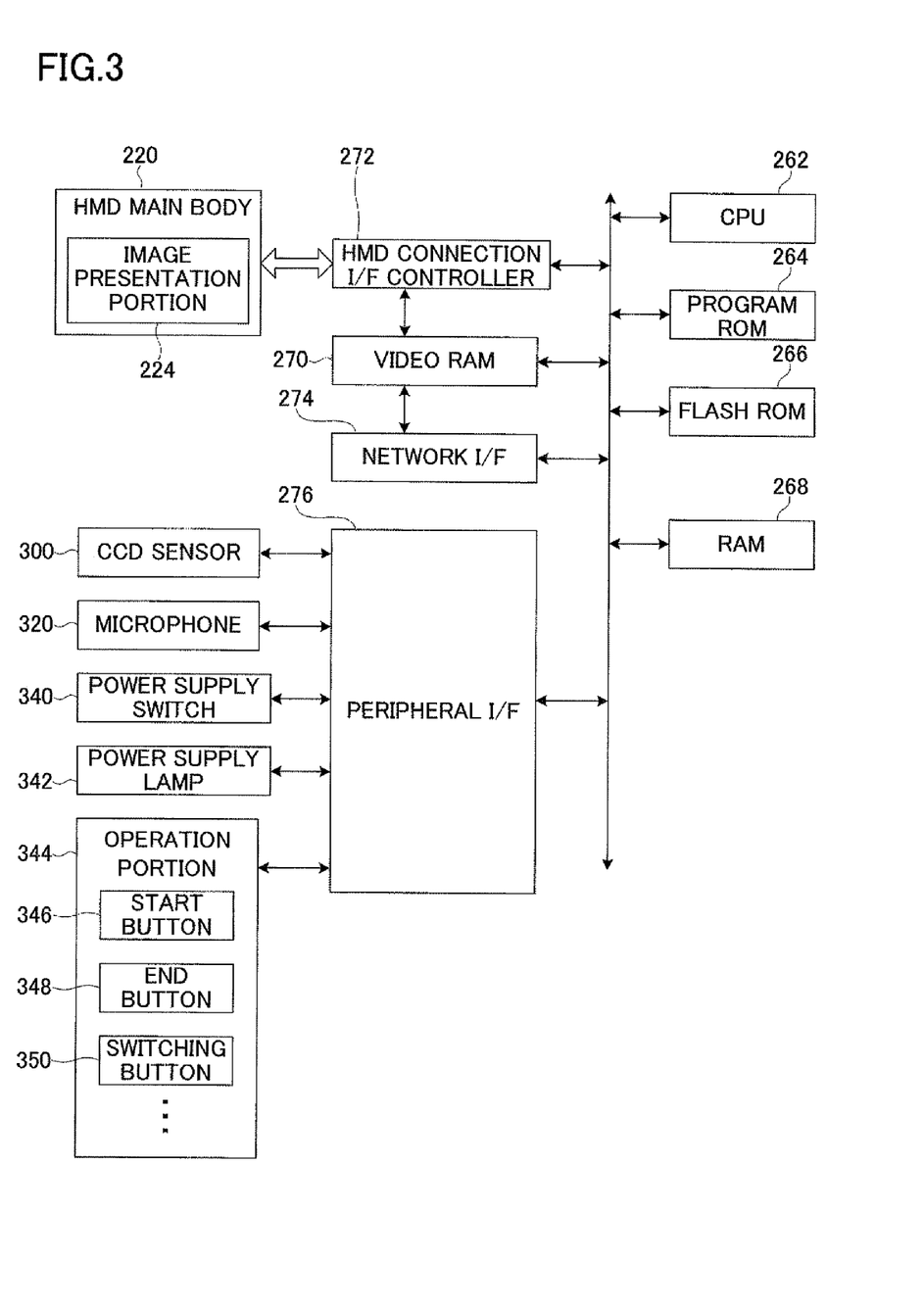
FIG. 3 is a diagram showing a block configuration of a control box.

A block configuration of the control box 260 will be described with reference to FIG. 3. The control box 260 includes a CPU 262, a program ROM 264, a flash ROM 266 and a RAM 268. The CPU 262 is responsible for control of its own device. The program ROM 264 stores various programs including a program for a process during recording to be described later. The flash ROM 266 is a non-volatile memory. Various data is stored in the flash ROM 266. The RAM 268 serves as a work area. For example, the CPU 262 reads out the program for the process during recording shown in FIG. 4 from the program ROM 264. The CPU 262 executes the read-out program on the RAM 268. The CPU 262 reads out a program for a reproduction process for content data acquired from the content data storage portion 500, from the program ROM 264. The CPU 262 executes the read-out program on the RAM 268. A content image is formed by the reproduction process. When the presentation image switching process (see FIG. 9) to be described later is adopted, the CPU 262 reads out a program for the presentation image switching process shown in FIG. 9 from the program ROM 264. The CPU 262 executes the read-out program on the RAM 268.

Various functional units are configured by the CPU 262 executing various programs stored in the program ROM 264 on the RAM 268. For example, when the HMD 200, the content data storage portion 500, the imaging data storage portion 510, the table storage portion 520 and the sound data storage portion 530 are formed as one body by the configuration as shown in FIG. 3, the flash ROM 266 functions as the content data storage portion 500, the imaging data storage portion 510, the table storage portion 520 and the sound data storage portion 530. That is, on the basis of the configuration of FIG. 3, the storage portions 500, 510, 520 and 530 are configured by one flash ROM 266 (one storage area) in hardware.

The control box 260 includes a video RAM 270, an HMD connection I/F controller 272, a network I/F 274 and a peripheral I/F 276. The video RAM 270 stores a content image or the like formed by a reproduction process for content data. The HMD connection I/F controller 272 is connected to the HMD main body 220 via the signal cable 280. The HMD connection I/F controller 272 controls the inputs/outputs of various signals to be performed between the control box 260 and the image presentation portion 224 of the HMD main body 220 on the basis of a command from the CPU 262. Specifically, the HMD connection I/F controller 272 outputs an image signal including a content image, a control signal for the image presentation portion 224, or the like to the image presentation portion 224.

The network I/F 274 performs communication via the network 700. The peripheral I/F 276 is a connection I/F to which the CCD sensor 300, the microphone 320, a power supply switch 340, a power supply lamp 342 and an operation portion 344 are connected. The CPU 262 acquires imaging data including an object imaged by the CCD sensor 300 via the peripheral I/F 276. Also, the CPU 262 acquires sound data representing a sound input by the microphone 320 via the peripheral I/F 276. The power supply switch 340 is a switch for turning on/off the image presentation portion 224 and the control box 260. The user turns on/off the image presentation portion 224 and the control box 260 via the power supply switch 340. The power supply lamp 342 is lit when the power supply switch 340 is turned on. On the other hand, the power supply lamp 342 is not lit when the power supply switch 340 is turned off. The operation portion 344 includes predetermined keys such as a start button 346, an end button 348 and a switching button 350. When a predetermined instruction is input to the HMD 200, the operation portion 344 is operated by the user.

(Processes to be Executed by Imaging Data Usage System)

Various processes to be executed by the HMD 200 and the information processing device 600 of the imaging data usage system 100 will now be described. Hereinafter, an example in which content data is manual data regarding a manual for predetermined work, and content images indicated by the content data are each of a plurality of manual images configuring the manual will be described. Accordingly, hereinafter, the content data is also referred to as manual data and the content image is also referred to as a manual image.

(Process During Recording)

Figure 5:
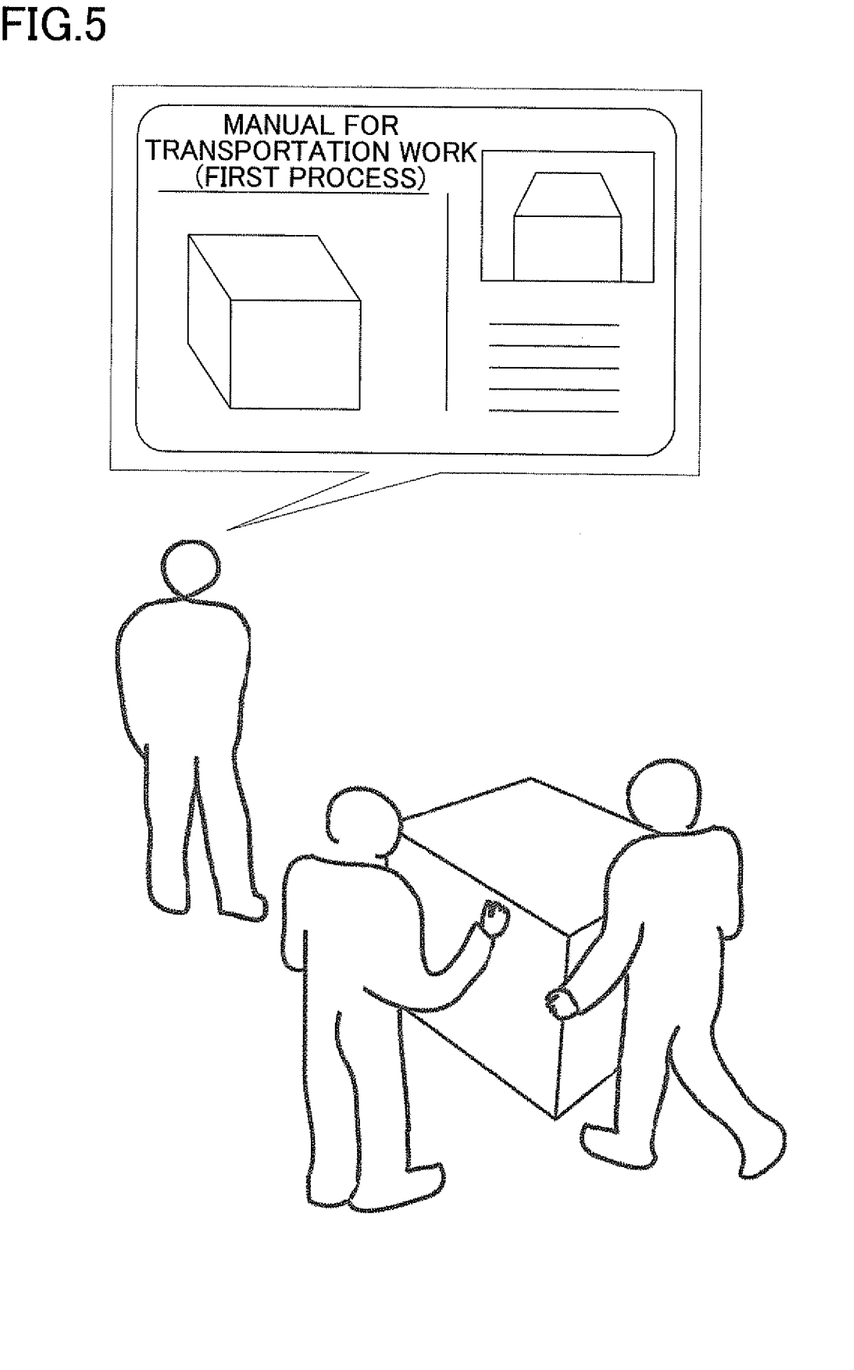
FIG. 5 is a diagram showing a work state according to a user using the head mounted display.
Figure 6:
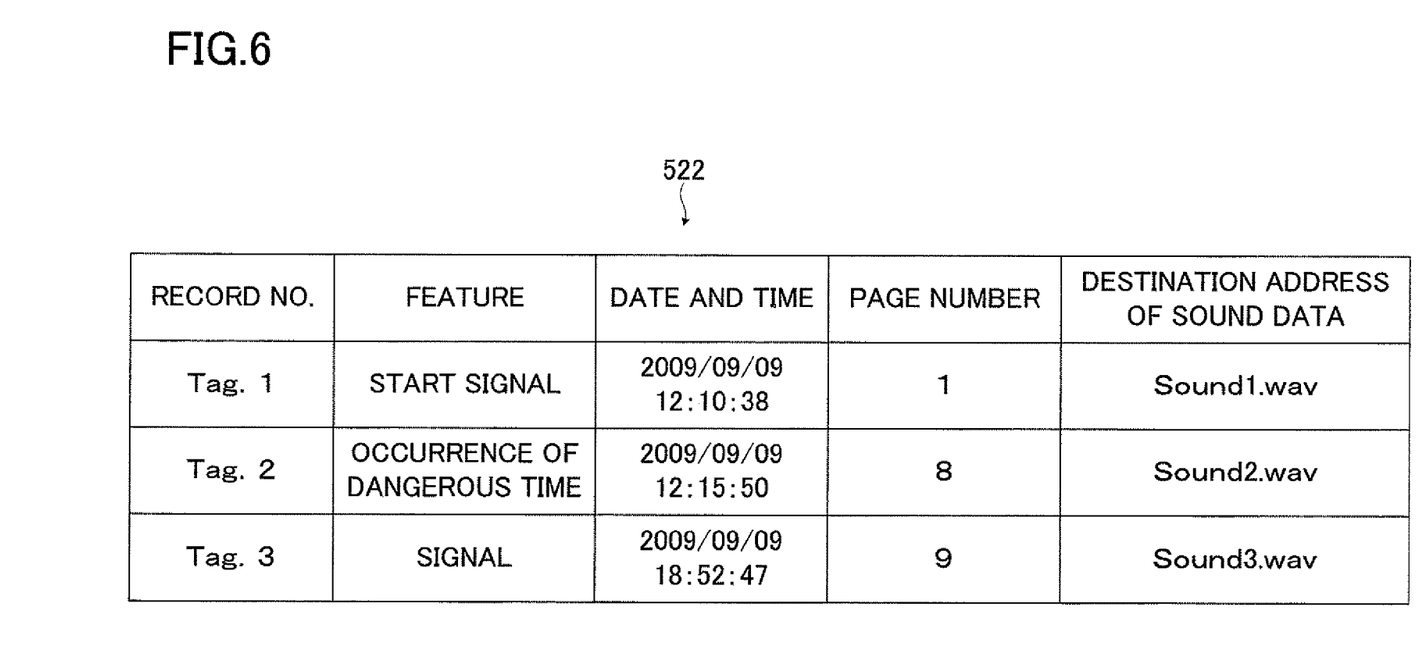
FIG. 6 is a diagram showing a first association table.

A process during recording to be executed by the CPU 262 of the control box 260 of the HMD 200 will be described with reference to FIGS. 4 to 6. The CPU 262 determines whether a start instruction to present a manual image is input (S100). The start instruction is input by the user operating the start button 346. When no start instruction is input as a determination result (S100: No), the CPU 262 waits for the start instruction to be input.

On the other hand, when the start instruction is input (S100: Yes), the CPU 262 starts to present a manual image. For example, when the predetermined work like transportation work as shown in FIG. 5 is started, the user operates the start button 346 to view a manual for the work. The CPU 262 acquires manual data from the content data storage portion 500 via the network I/F 274. The CPU 262 performs a reproduction process for the acquired manual data. The CPU 262 stores a manual image formed by the reproduction process in the video RAM 270. The CPU 262 outputs an image signal including the manual image stored in the video RAM 270 and a control signal for the presentation of the manual image to the image presentation portion 224 via the HMD connection I/F controller 272. Accordingly, the CPU 262 performs the presentation of the manual image from the image presentation portion 224. Thereby, a user (for example, refer to a user, who does not transport baggage, shown in FIG. 5) views the manual image.

Subsequently, the CPU 262, which starts the presentation of the manual image, starts imaging by the CCD sensor 300 (S104). Here, the CCD sensor 300 is installed on the top of the image presentation portion 224. Thus, an object existing in a line-of-sight direction is imaged by the CCD sensor 300. For example, imaging by the CCD sensor 300 is performed by a video recording method. Imaging data imaged by the CCD sensor 300 is buffered on the RAM 268. The CPU 262 continues to store the imaging data in the imaging data storage portion 510 via the network I/F 274 until an end instruction is input in S114 to be described later. The imaging data includes imaging time position information related to an imaging time (date and time).

The CPU 262 starts to acquire a sound collected by the microphone 320 along with the execution of S104 (S106). Specifically, in S106, the CPU 262 starts to acquire a sound uttered by the user on which the HMD main body 220 is mounted. Acquired sound data includes acquisition time position information related to a time (date and time). The acquired sound data is sequentially buffered on the RAM 268 along with the acquisition time position information. In S108, the CPU 262 performs sound feature recognition/analysis for the sound data on the RAM 268. The CPU 262 determines whether a sound having a preset specific feature is included in the sound data as a sound feature recognition/analysis result (S110). For example, a start signal uttered at a start time of predetermined work (for example, "start"), a sound uttered in a dangerous time (for example, "uh-oh"), a signal (for example, "OK"), or the like is included as the sound having the specific feature.

When the sound having the specific feature is not included in the sound data acquired in S106 and buffered on the RAM 268 as a result of determination of S110 (S110: No), the CPU 262 returns the process to S106. The CPU 262 repeats S106 to S110. On the other hand, when the sound having the specific feature is included (S110: Yes), the CPU 262 specifies a timing when the sound having the specific feature is uttered. The CPU 262 cuts out sound data of a predetermined range of before-and-after time periods including a part of the sound having the specific feature. The CPU 262 stores the cut-out sound data in the sound data storage portion 530 via the network I/F 274. The CPU 262 registers (adds and registers) a record including the specific feature, first time position information (written as a "date and time" in FIG. 6) related to the timing when the sound having the specific feature is uttered, identification information (written as a "page number" in FIG. 6) of a currently presented manual image, and the sound data (in detail, an address in which the sound data is stored) in the first association table 522 (S112).

Specifically, for example, the CPU 262 adds and registers a record (see a record "Tag 3" of FIG. 6) including a feature "signal" related to a signal "OK", first time position information related to the timing when the signal "OK" is uttered, a page number of a presented manual (manual image), and a storage destination address of sound data cut out to include the signal "OK" in the first association table 522 stored in the table storage portion 520. The first association table 522 shown in FIG. 6 is in a state in which a record "Tag 1" and a record "Tag 2" are already registered.

After S112 is performed, the CPU 262 determines whether an end instruction is input. The end instruction is input by the user operating the end button 348. When no end instruction is input as a determination result (S114: No), the CPU 262 returns the process to S106. The CPU 262 repeats S106 to S114. On the other hand, when the end instruction is input (S114: Yes), the CPU 262 ends the process. When the user operates the switching button 350, the CPU 262 acquires a switching instruction and switches a presented manual image to a manual image of the next page.

(Process During Reproduction)

Two examples of a process during reproduction to be performed by the CPU 602 of the information processing device 600 will be described. Here, the first example of the process during reproduction is a process to be performed when the single HMD 200 is included in the imaging data usage system 100. For example, the first example of the process during reproduction is a process to be performed when only the HMD 202 exists in FIG. 1. The second example of the process during reproduction is a process to be performed when a plurality of HMD 200 is included in the imaging data usage system 100. In the second example of the process during reproduction, for example, when three persons perform predetermined work as shown in FIG. 5, one user uses the HMD 202, another user uses the HMD 204, and the other uses the HMD 206. The second example is a process to be performed when the process during recording shown in FIG. 4 is performed in each of the HMDs 202, 204 and 206. In the case of the second example, all of the users wear the HMD main body 220 as shown in FIG. 2 and carry the control box 260 to the waist, for example. All the users view a predetermined manual image. When the user operates the operation portion 612 of the information processing device 600 and gives an instruction to display manual data stored in the content data storage portion 500, the process during reproduction is started. The CPU 602 reads out a program for the process during reproduction stored in the storage portion 608. The CPU 602 executes the read-out program on the RAM 606.

First Example

The first example of the process during reproduction will be described with reference to FIG. 7. The CPU 602 starting the process displays a manual image of a specific page indicated by manual data on the display portion 610 (S200). Thereafter, the CPU 602 accesses the first association table 522 stored in the table storage portion 520. The CPU 602 determines whether a record including a page number consistent with a page number of the displayed manual image exists in the first association table 522 (S202). When a record including the consistent number does not exist as a determination result (S202: No), the CPU 602 returns the process to S200. On the other hand, when the record including the consistent number exists (S202: Yes), the CPU 602 moves the process to S204.

In S204, the CPU 602 sets a reproduction start point in the imaging data. Specifically, in S204, the CPU 602 acquires first time position information included in the record of the consistent number from the first association table 522. The CPU 602 accesses imaging data stored in the imaging data storage portion 510. The CPU 602 specifies imaging data including a date and time indicated by the acquired first time position information by imaging time position information included in the imaging data. The CPU 602 acquires the imaging data specified via the network I/F 614 on the RAM 606. For the imaging data acquired in the process, the CPU 602 sets a date and time, which is a predetermined time period before the date and time indicated by the acquired first time position information, as a reproduction start point. For example, a date and time, which is 2 minutes and 30 seconds before the date and time indicated by the first time position information, is set as a reproduction start point. After S204 is performed, the CPU 602 starts to reproduce imaging data from a position corresponding to the reproduction start point set in S204 (S206).

S206 may be as follows. Upon reproduction of S206, the CPU 602 accesses the sound data storage portion 530. The CPU 602 reproduces sound data acquired when imaging data of a reproduction target is imaged in synchronization with the imaging data. In this case, for example, the CPU 602 synchronizes the two on the basis of imaging time position information included in the imaging data and acquisition time position information related to a time (date and time) included in the sound data. Accordingly, even a sound uttered by the user is able to recognize via the information processing device 600.

After S206 is performed, the CPU 602 determines whether the reproduction of imaging data to a segment end point is completed (S208). In S208, the CPU 602 determines whether the reproduction to a position, for example, 5 minutes after the reproduction start, which serves as the segment end point, is completed. When the reproduction to the segment end position is not completed as a determination result (S208: No), the CPU 602 continues the reproduction of imaging data. On the other hand, when the reproduction to the segment end point is completed (S208: Yes), the CPU 602 stops the reproduction of imaging data. Thereafter, the CPU 602 determines whether an end instruction of this process is input (S210). The end instruction is input by the user's operation via the operation portion 612. When no end instruction is input as the determination result (S210: No), the CPU 602 returns the process to S200. On the other hand, when the end instruction is input (S210: Yes), the CPU 602 ends this process.

The reproduction start point and the segment end point are set to include the date and time indicated by the first time position information. According to the above-described example, on the basis of the date and time indicated by the first time position information, a point in time 2 minutes and 30 seconds before is set as the reproduction start point, and a point in time 5 minutes after the reproduction start is set as the segment end point. That is, on the basis of the date and time indicated by the first time position information, the imaging data is reproduced during a period 2 minutes and 30 seconds before and after the date and time (for a total of 5 minutes).

Second Example

The second example of the process during reproduction will be described with reference to FIG. 8. The CPU 602 starting this process performs S300 and S302. Here, S300 and S302 are processes corresponding to S200 and S202 of the first example shown in FIG. 7. Therefore, details of these processes are omitted.

In S304, the CPU 602 sets a reproduction start point in imaging data. Specifically, in S304, the CPU 602 acquires first time position information included in a record of a page number consistent with a page number of the displayed manual image from the first association table 522. For example, when three users perform the predetermined work as shown in FIG. 5, three pieces of the first time position information are maximally acquired in step S304. That is, in a state in which a manual image of the same page number is presented, one user utters a sound serving as a target of a feature "generated at a time of danger". Another user utters another sound serving as the target of the feature "generated at a time of danger". The other user utters a sound serving as a target of a feature "signal". In this case, the CPUs 262 of the control boxes 260 of the HMDs 202, 204 and 206 of the users respectively register (add and register) a record in the first association table 522 in S112 of FIG. 4.

In S304, the CPU 602 accesses imaging data stored in the imaging data storage portion 510. The CPU 602 specifies imaging data including a date and time indicated by the acquired first time position information by imaging time position information included in the imaging data. The CPU 602 acquires the specified imaging data on the RAM 606, via the network I/F 614. Even in this case, a plurality of imaging data is acquired. That is, on the basis of FIG. 5, three imaging data imaged by the CCD sensors 300 of the HMDs 202, 204 and 206 of one user, another user and the other user are acquired. In S304, for each of the acquired imaging data, the CPU 602 sets each date and time, which is a predetermined time period before the date and time indicated by the acquired first time position information, as a reproduction start point. For example, a date and time, which is 2 minutes and 30 seconds before the date and time indicated by the first time position information, is set as a reproduction start point.

After S304 is performed, the CPU 602 determines whether each date and time, which is a predetermined time period before the date and time indicated by the first time position information, is set as a reproduction start point for each of the plurality of imaging data (S306). When the reproduction start point is not set for each of the imaging data as a determination result (S306: No), the CPU 602 returns the process to S304. The CPU 602 sets a date and time, which is a predetermined time period before a date and time indicated by first time position information that is not set, as a reproduction start point, for imaging data that is not set. On the other hand, when all are set (S306: Yes), the CPU 602 moves the process to S308.

In S308, the CPU 602 determines whether a reproduction instruction for imaging data is input. The reproduction instruction is input by user's operation via the operation portion 612. When a plurality of imaging data is acquired in S304, it is possible to indicate data to be reproduced and data which is not reproduced among the plurality of imaging data in accordance with the input of the reproduction instruction. When no reproduction instruction is input as a determination result (S308: No), the CPU 602 waits for the reproduction instruction to be input. On the other hand, when the reproduction instruction is input (S308: Yes), the CPU 602 starts to sequentially reproduce each of the imaging data from the set reproduction start point (S309). Thereafter, the CPU 602 moves the process to S310.

In S310, the CPU 602 determines whether the reproduction to a segment end point is completed for each of the reproduction start points set in S306. As in the first example, for example, the segment end point becomes a position, which is 5 minutes after the reproduction start point. When the reproduction to the segment end point is not completed as a determination result (S310: No), the CPU 602 continues the reproduction of imaging data. On the other hand, when the reproduction to the segment end point is completed (S310: Yes), the CPU 602 stops the reproduction of imaging data. When the plurality of imaging data is acquired in S304 and the instruction to reproduce the plurality of imaging data is input in S308, the CPU 602 determines the presence of imaging data which is not reproduced. The CPU 602 repeats the reproduction of imaging data and the determination of S310 until imaging data which is not reproduced does not exist. When the reproduction to the segment end point is completed for all the imaging data, the CPU 602 determines whether an end instruction for this process is input (S312). The end instruction is input by user's operation via the operation portion 612. When no end instruction is input as the determination result (S312: No), the CPU 602 returns the process to S300. On the other hand, when the end instruction is input (S312: Yes), the CPU 602 ends the process.

As in the first example, the reproduction start point and the segment end point are set to include a date and time indicated by the first time position information.

Here, the determination of the completion of reproduction to the segment end point related to S310 will be described. In the second example, a plurality of reproduction start points is set in one imaging data. For example, the segment end point becomes a position 5 minutes after the reproduction start point. In this case, another reproduction start point may be set within 5 minutes from one reproduction start point. In this case, when the reproduction from one reproduction start point is completed, the CPU 602 continuously reproduces imaging data to a position 5 minutes after another reproduction start point. Thereafter, the CPU 602 determines that the reproduction from another reproduction start point to another segment end point is completed. Also, the CPU 602 determines that the reproduction from the one reproduction start point is completed.

Even in the second example of the process during reproduction like the first example, the CPU 602 may be configured to reproduce sound data. Even in this case, the CPU 602 accesses the sound data storage portion 530. The CPU 602 reproduces sound data acquired when imaging data of a reproduction target is imaged in synchronization with the imaging data. The synchronization is performed as described above.

Incidentally, the above-described exemplary embodiments may also be implemented as in the following (1) to (5).

(1) In the above-described exemplary embodiments, the HMD main body 220 and the control box 260 are separated in the HMD 200. Alternatively, it is possible to implement an HMD in which the HMD main body 220 and the control box 260 are formed as one body. In this case, for example, each part of the control box 260 shown in FIG. 3 is accommodated within a cover which forms the image presentation portion 224.

(2) In the above-described exemplary embodiments, the process during recording in the HMD 200 and the first example and the second example of the process during reproduction in the information processing device 600 are configured as follows. That is, in S112 of the process during recording shown in FIG. 4, the first time position information is registered in the first association table 522. In S204 of the first example of the process during reproduction shown in FIG. 7 and S304 of the second example of the process during reproduction shown in FIG. 8, a date and time, which is a predetermined time period before a date and time indicated by the first time position information, is set as a reproduction start point. Thereafter, imaging data is reproduced from the set reproduction start point.

Figure 9:
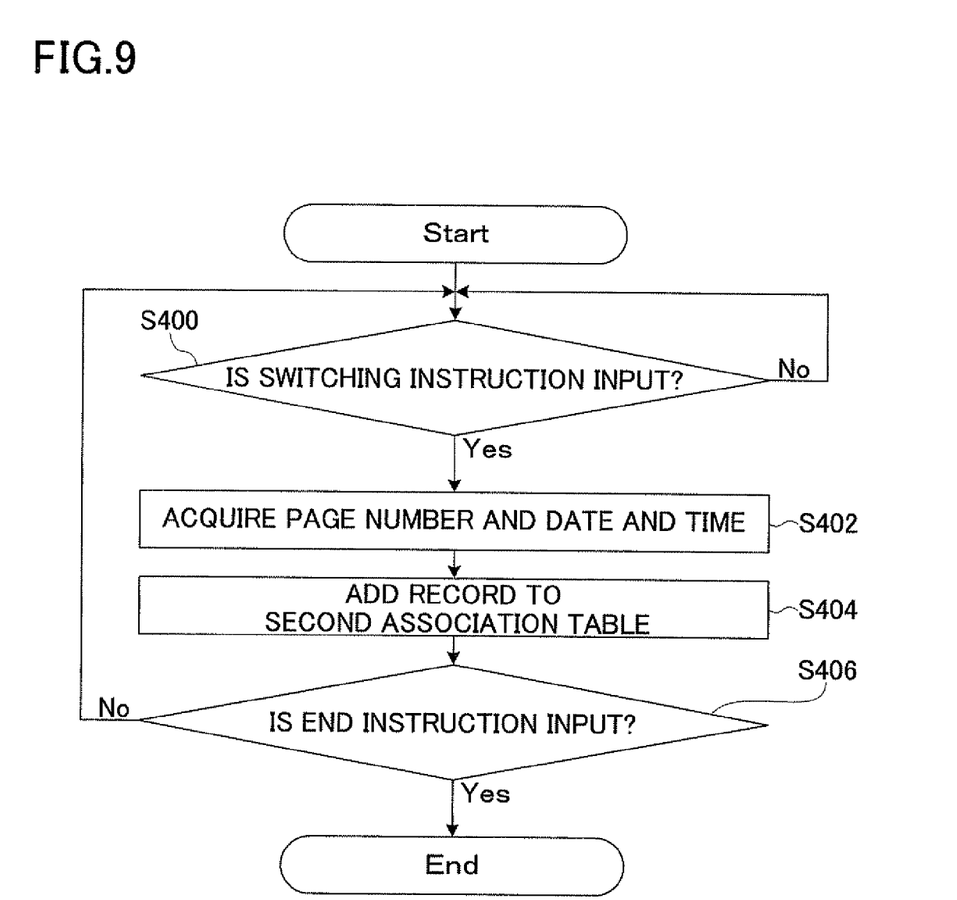
FIG. 9 is a diagram showing a flowchart of a presentation image switching process.
Figure 10:
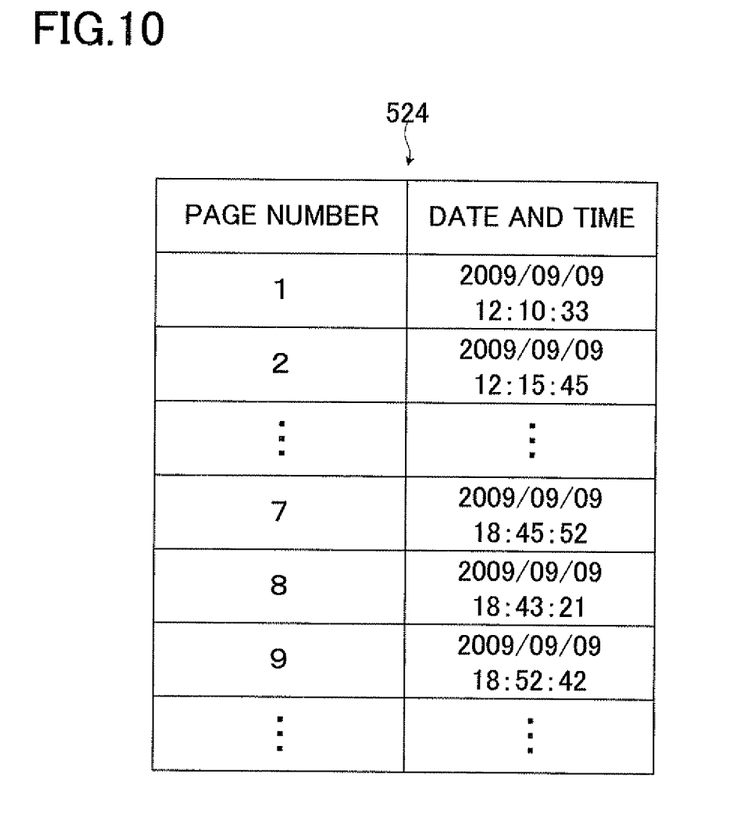
FIG. 10 is a diagram showing a second association table.

Incidentally, in the information processing device 600, a configuration for checking a part where a sound having a specific feature is uttered may adopt the presentation image switching process shown in FIG. 9. That is, for example, the presentation image switching process shown in FIG. 9 is started between S100 and S104 of the process during recording shown in FIG. 4. By the presentation image switching process, records are sequentially added and registered in the second association table 524. Thereafter, the CPU 602 of the information processing device 600 specifies and acquires imaging data on the basis of a date and time indicated by first time position information of the first association table 522 in S204 shown in FIG. 7 or S304 of FIG. 8. The CPU 602 accesses the second association table 524 stored in the table storage portion 520. The CPU 602 acquires second time position information (written as a "date and time" in FIG. 10) registered in association with a corresponding page number. The corresponding page number is a page number consistent with a page number of the displayed manual image. The CPU 602 sets a date and time registered in association with a corresponding page number and indicated by the acquired second time position information as a reproduction start point (see S204 of FIG. 7 and S304 of FIG. 8). In the second association table 524, the CPU 602 acquires a date and time indicated by the second time position information included in a record next to a record including the second time position information as the reproduction start point. The CPU 602 sets a date and time indicated by the second time position information included in the next record as a segment end point (see S208 of FIG. 7 and S310 of FIG. 8). At the segment end point set as described above, the CPU 602 stops the reproduction of imaging data (see S208 of FIG. 7: Yes and S310 of FIG. 8: Yes).

The presentation image switching process will be described with reference to FIG. 9. In the presentation image switching process, the second association table 524 shown in FIG. 10 is adopted. The CPU 262 of the control box 260 of the HMD 200 starting the process determines whether a switching instruction for switching a presented manual image to another manual image is input (S400). Specifically, the CPU 262 determines whether a switching instruction for switching to a manual image of the next page is input. The switching instruction is input by the user operating the switching button 350. For example, in the transportation work as shown in FIG. 5, the user views a manual image of the next ninth process when an eighth process ends. To view the manual image of the ninth process, the user operates the switching button 350. When no switching instruction is input as a determination result (S400: No), the CPU 262 waits for the switching instruction to be input.

On the other hand, when the switching instruction is input (S400: Yes), the CPU 262 acquires identification information for identifying another manual image newly presented by the switching instruction, that is, a page number and date and time as second time position information that is related to a timing when the switching instruction to another manual image is input (S402). In a state in which the page number and the second time position information are associated with each other, the page number and the second time position information are added and registered in the second association table 524 stored in the table storage portion 520 (S404). The timing when the presentation of another manual image is started is substantially the same as the timing when the switching instruction is input.

For example, when switching is performed from the manual image of the eighth process arranged in an eighth page to the manual image of the ninth process arranged in the ninth page, the CPU 262 acquires a page number "9" of the manual image of the ninth process in S402. In S402, the CPU 262 acquires a date and time when the switching instruction is input, for example, "2009/09/09 18:52:42". In S404, the CPU 262 adds and registers a record including the acquired page number "9" and the date and time "2009/09/09 18:52:42" in the second association table 524 as shown in FIG. 10.

After S404 is performed, the CPU 262 determines whether an end instruction is input (S406). The end instruction is the same as the end instruction input in S114 of FIG. 4. When no end instruction is input as a determination result (S406: No), the CPU 262 returns the process to S400. The CPU 262 repeats S400 to S406. On the other hand, when the end instruction is input (S406: Yes), the CPU 262 ends the process during recording shown in FIG. 4 and the presentation image switching process. When the presentation image switching process is adopted, it is possible to omit the registration of first time position information to the first association table 522. In this case, the CPU 602 specifies and acquires imaging data on the basis of the second time position information of the second association table 524.

Figure 4:
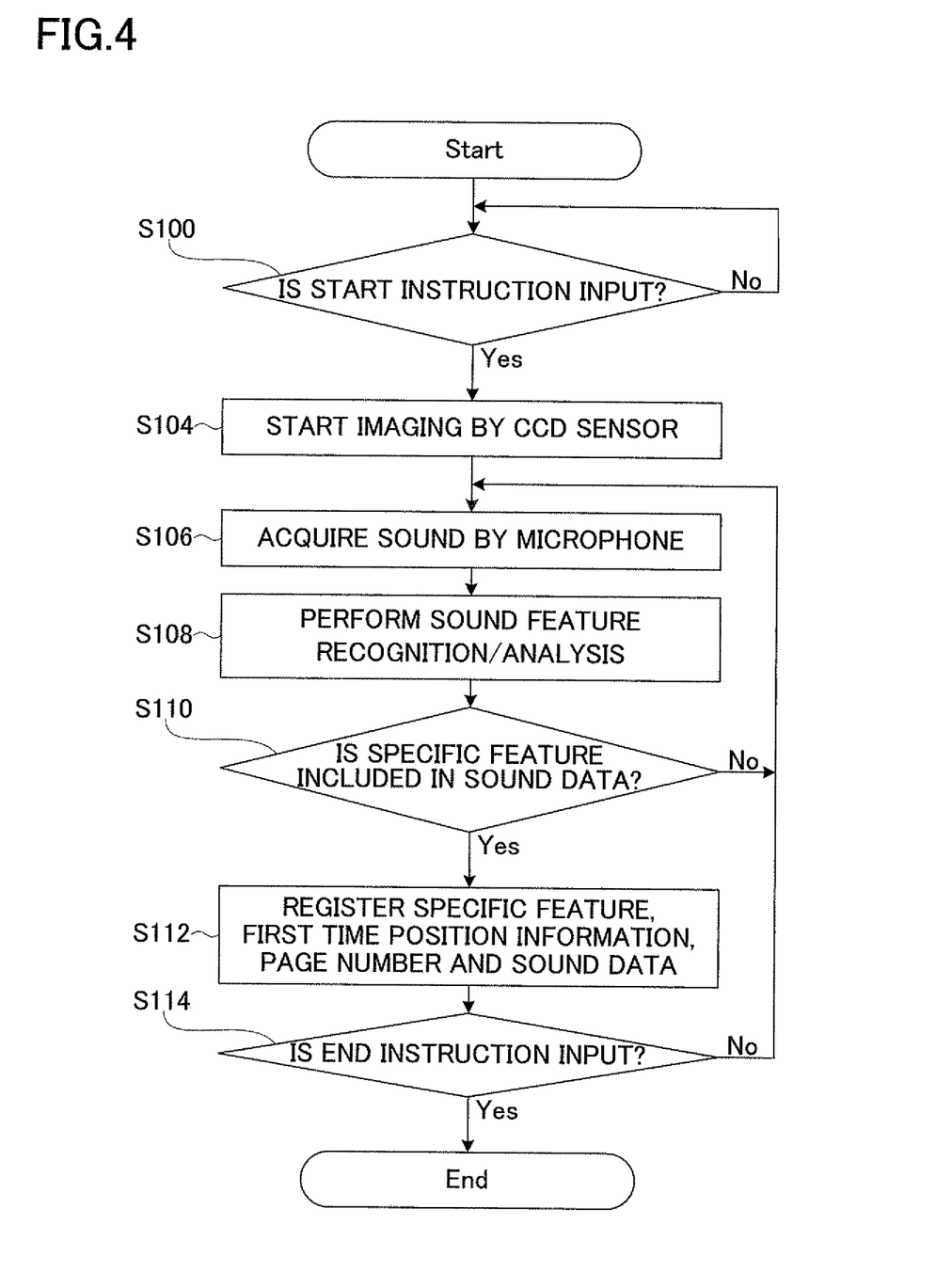
FIG. 4 is a diagram showing a flowchart of a process during recording.

(3) In the above-described exemplary embodiments, the first time position information according to a date and time for specifying "year/month/day/hour/minute/second" or the like is registered in the first association table 522 in S112 of FIG. 4. Thereafter, in S204 of FIG. 7 and S304 of FIG. 8, imaging data imaged at a point in time indicated by the first time position information registered in the first association table 522 is specified on the basis of the first time position information and imaging time position information included in the imaging data.

Alternatively, it is possible to specify imaging data by a different configuration. For example, a configuration in which an identifier for specifying the association with each record of the first association table 522 is assigned to imaging data may be adopted. In this case, it is possible to specify predetermined imaging data by the identifier as in the above-described configuration or the like. In the process during recording shown in FIG. 4, imaging is started (S104) sequentially (substantially simultaneously) in accordance with the start of reproduction of manual data (S100: Yes), and a sound is acquired (S106). Thus, for example, when the above-described identifier is adopted, elapsed time after the reproduction start of manual data may be registered as first time position information in the first association table 522. The configuration adopting the identifier is also applicable to the case where the above-described presentation image switching process is adopted. Even in this case, it is possible to register the elapsed time after the reproduction start of manual data as second time position information in the second association table 524.

(4) In the above-described exemplary embodiments, a video recording method has been illustrated as imaging by the CCD sensor 300. Alternatively, the imaging by the CCD sensor 300 is possible by other methods. For example, the imaging by the CCD sensor 30 may be performed for frame-pickup still images. In this case, the imaging is repeated at a predetermined interval. Thus, the number of times of imaging may be treated as imaging time position information. For example, when the imaging is performed at a rate of one per second, it is possible to determine that $100^{th}$ imaging is imaging data (a still image) when 100 seconds have elapsed from the first imaging.

(5) In the above-described exemplary embodiments, a configuration of determining whether a reproduction instruction for imaging data is input is adopted in S308 shown in FIG. 8. When a plurality of imaging data is acquired in S304, a configuration capable of indicating data to be reproduced and data which is not reproduced among the plurality of imaging data in accordance with the input of the reproduction instruction is adopted. According to this configuration, it is possible to prevent the reproduction of imaging data which is not intended by a user. Here, when the number of imaging data acquired in S304 is one, a determination of the presence/absence of the reproduction instruction input by the user's operation in S308 may not be made. That is, when the number of imaging data acquired in S304 is one, it is regarded that the reproduction instruction is input (see S308 of FIG. 8: Yes), and the reproduction starts from the reproduction start point of the acquired imaging data (see S309 of FIG. 8) as in S206 of the first example of the process during reproduction shown in FIG. 7. Accordingly, in a situation where imaging data to be reproduced is practically decided, it is possible to omit the user's operation as the reproduction instruction input. Consequently, it is possible to quickly start the reproduction from a reproduction start point of imaging data.

According to the above-described exemplary embodiments and modifications based on (1) to (5), it is possible to image the state of executed work by the CCD sensor 300 in relation to the predetermined work performed while a manual image is checked using the HMD 200 (see S104 of FIG. 4). Thus, it is possible to reproduce imaging data and check the work state. A predetermined point in time corresponding to the first time position information registered in the first association table 522 shown in FIG. 6 or a predetermined point in time corresponding to the second time position information registered in the second association table 524 shown in FIG. 10 is set as the reproduction start point (see S204 of FIG. 7 and S304 of FIG. 8). The imaging data is reproduced from the set reproduction start point. Accordingly, it is possible to efficiently check a part where a sound having a specific feature is uttered at work (S110 of FIG. 4: Yes). For example, it is possible to exhibit the effect in a setting where explanation of work is given for a person unfamiliar with the work or the like in relation to each process of the predetermined work or the progress thereof, or in a setting where each process and the progress thereof are reviewed.

The apparatus, systems and methods described above with reference to the various embodiments are merely examples. Embodiments of the present invention are not limited to the embodiments described above. While various features have been described in conjunction with the examples outlined above, various alternatives, modifications, variations, and/or improvements of those features and/or examples are possible. Accordingly, the examples, as set forth above, are intended to merely be illustrative. Various changes may be made without departing from the scope of the underlying principles.

What is claimed is:
1. A head mounted display comprising:
an image presentation portion that is configured to sequentially present each of content images indicated by content data to a user's eye, the image presentation portion presenting the content images that are indicated by a plurality of pages that differ from each other;
an imaging portion that images an object when the content images are presented by the image presentation portion;
an event acquisition portion that acquires an event occurring outside the head mounted display;
a storage control unit that stores imaging data including the object imaged by the imaging portion and imaging time position information regarding an imaging time in an imaging data storage portion;
an event determination unit that determines whether the event acquired by the event acquisition portion has a specific feature;
a first specification unit that specifies first time position information regarding a timing when the event determined to have the specific feature by the event determination unit is occurred; and
a first association registration unit, which, when the event determination unit determines that the event has the specific feature, associates presentation identification information for identifying the content images presented by the image presentation portion with the first time position information, and which registers the presentation identification information and the first time position information in a first association storage unit, the first association registration unit associating a num- ber of the page of the content image as the presentation identification information with the first time position information.

2. The head mounted display according to claim 1, wherein:
the head mounted display is connected to the imaging data storage portion via a network; and
the storage control unit stores the imaging data and the imaging time position information by accessing the imaging data storage portion via the network.

3. The head mounted display according to claim 1, wherein:
the head mounted display is connected to the first association storage unit via a network; and
the first association registration unit registers the presentation identification information and the first time position information by accessing the first association storage unit via the network.

4. The head mounted display according to claim 1, wherein:
the event acquisition portion creates event data including the acquired event; and
the first association registration unit further associates the event data including the event determined to have the specific feature by the event determination unit and registers the event data in the first association storage unit.

5. The head mounted display according to claim 1, further comprising:
a command acquisition portion that acquires a command for switching first content image presented by the image presentation portion to second content image; and
a second association registration unit that associates second time position information regarding an acquisition timing of the command acquired by the command acquisition portion with second presentation identification information for identifying the second content image newly presented by the command and registers the second time position information and the second presentation identification information in a second association storage unit.

6. The head mounted display according to claim 5, wherein:
the head mounted display is connected to the second association storage unit via a network; and
the second association registration unit registers the second time position information and the second presentation identification information by accessing the second association storage unit via the network.

7. The head mounted display according to claim 1, wherein:
the event acquisition portion acquires the event as a sound;
the event determination unit analyzes the sound acquired by the event acquisition portion; and
the event determination unit determines that the event, which has the specific feature when a preset feature is recognized from the sound acquired by the event acquisition portion, as an analysis result.

8. A head mounted display comprising:
an image presentation portion that is configured to sequentially present each of content images indicated by content data to a user's eye, the image presentation portion presenting the content images that are indicated by a plurality of pages that differ from each other;
an imaging portion that images an object when the content images are presented by the image presentation portion;
an event acquisition portion that acquires an event occurring outside the head mounted display;
a memory configured to store instructions; and
a processor configured to execute the instructions stored in the memory to:
store imaging data including the object imaged by the imaging portion and imaging time position information regarding an imaging time in an imaging data storage portion;
determine whether the event acquired by the event acquisition portion has a specific feature;
specify first time position information regarding a timing when the event determined to have the specific feature is occurred; and
when it is determined that the event has the specific feature, associate presentation identification information for identifying the content images presented by the image presentation portion with the first time position information, register the presentation identification information and the first time position information in a first association storage unit, and associate a number of the page of the content image as the presentation identification information with the first time position information.

9. An imaging data usage system comprising:
at least one head mounted display; and
an information processing device,
wherein the head mounted display comprises:
an image presentation portion that is configured to sequentially present each of content images indicated by content data to a user's eye, the image presentation portion presenting the content images that are indicated by a plurality of pages that differ from each other;
an imaging portion that images an object when the content images are presented by the image presentation portion;
an event acquisition portion that acquires an event occurring outside the head mounted display;
a storage control unit that stores imaging data including the object imaged by the imaging portion and imaging time position information regarding an imaging time in an imaging data storage portion;
an event determination unit that determines whether the event acquired by the event acquisition portion has a specific feature;
a first specification unit that specifies first time position information regarding a timing when the event determined to have the specific feature by the event determination unit is occurred; and
a first association registration unit, which, when the event determination unit determines that the event has the specific feature, associates presentation identification information for identifying the content images presented by the image presentation portion with the first time position information, and which registers the presentation identification information and the first time position information in a first association storage unit, the first association registration unit associating a number of the page of the content image as the presentation identification information with the first time position information, and
wherein the information processing device comprises:
a display portion that displays the content images;
an identification information determination unit that determines whether the presentation identification information consistent with display identification information for identifying the content images displayed on the display portion is registered in the first association storage unit by accessing the first association storage unit when the content images are displayed on the display portion;

a first acquisition unit that acquires the first time position information associated with the presentation identification information consistent with the display identification information when the identification information determination unit determines that the presentation identification information consistent with the display identification information is registered in the first association storage unit; and a reproduction unit that accesses the imaging time position information corresponding to the first time position information and the imaging data stored in the imaging data storage portion, and the reproduction unit specifies a part of the imaging data imaged at a predetermined point in time corresponding to the first time position information acquired by the first acquisition unit by the imaging time position information, the reproduction unit reproducing the specified part of the imaging data.

10. The imaging data usage system according to claim 9, further comprising a plurality of head mounted displays, wherein:

a plurality of imaging data is stored in the imaging data storage portion by the storage control units respectively provided in the plurality of head mounted displays;

a plurality of pieces of presentation identification information and a plurality of pieces of first time position information are associated and registered in the first association storage unit by the first association registration units respectively provided in the plurality of head mounted displays;

the first acquisition unit acquires all the first time position information associated with the presentation identification information consistent with the display identification information registered in the first association storage unit; and the reproduction unit accesses the imaging time position information corresponding to each of the plurality of pieces of first time position information and the imaging data stored in the imaging data storage portion and specifies a part of the imaging data imaged at a predetermined point in time corresponding to each of the plurality of pieces of first time position information acquired by the first acquisition unit by the imaging time position information.

11. The imaging data usage system according to claim 9, wherein:

the head mounted display is connected to the imaging data storage portion via a network; and the storage control unit stores the imaging data and the imaging time position information by accessing the imaging data storage portion via the network.

12. The imaging data usage system according to claim 9, wherein:

the head mounted display is connected to the first association storage unit via a network; and the first association registration unit registers the presentation identification information and the first time position information by accessing the first association storage unit via the network.

13. The imaging data usage system according to claim 9, wherein:

the event acquisition portion creates event data including the acquired event; and the first association registration unit further associates the event data including the event determined to have the specific feature by the event determination unit and registers the event data in the first association storage unit.

14. The imaging data usage system according to claim 9, wherein the head mounted display further comprises:

a command acquisition portion that acquires a command for switching first content image presented by the image presentation portion to second content image; and a second association registration unit that associates second time position information regarding an acquisition timing of the command acquired by the command acquisition portion with second presentation identification information for identifying the second content image newly presented by the command and registers the second time position information and the second presentation identification information in a second association storage unit.

15. The imaging data usage system according to claim 14, wherein:

the head mounted display is connected to the second association storage unit via a network; and the second association registration unit registers the second time position information and the second presentation identification information by accessing the second association storage unit via the network.

16. The imaging data usage system according to claim 9, wherein:

the event acquisition portion acquires the event as a sound;

the event determination unit analyzes the sound acquired by the event acquisition portion; and the event determination unit determines that the event, which has the specific feature when a preset feature is recognized from the sound acquired by the event acquisition portion, as an analysis result.

* * * * *